Feb. 23, 1971  K. W. REID  3,565,459
AUTOMATIC HITCH

Filed April 17, 1969  2 Sheets-Sheet 1

INVENTOR.
KENNETH W. REID
BY Church & Rogers
PATENT AGENTS

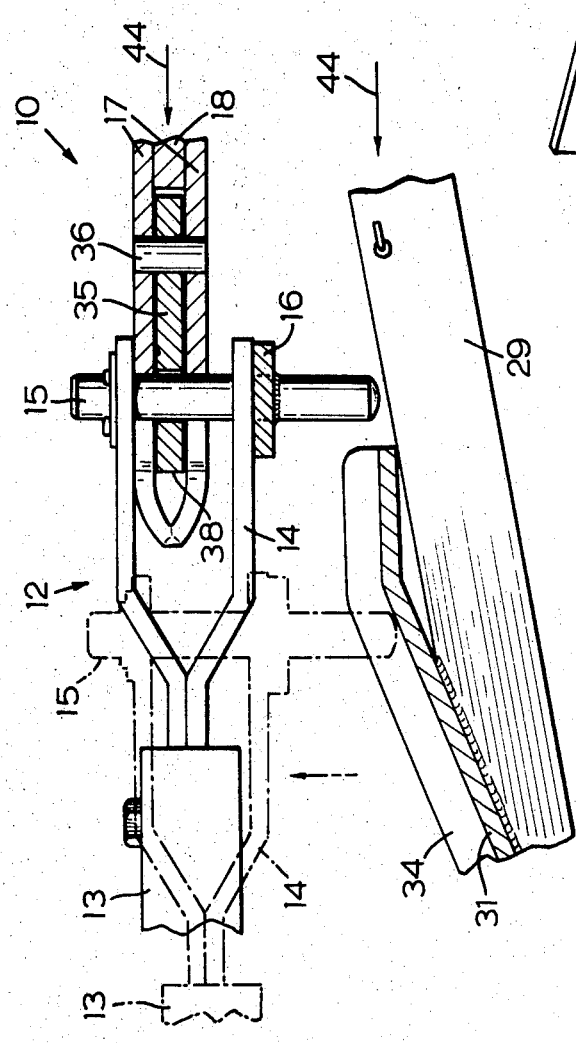
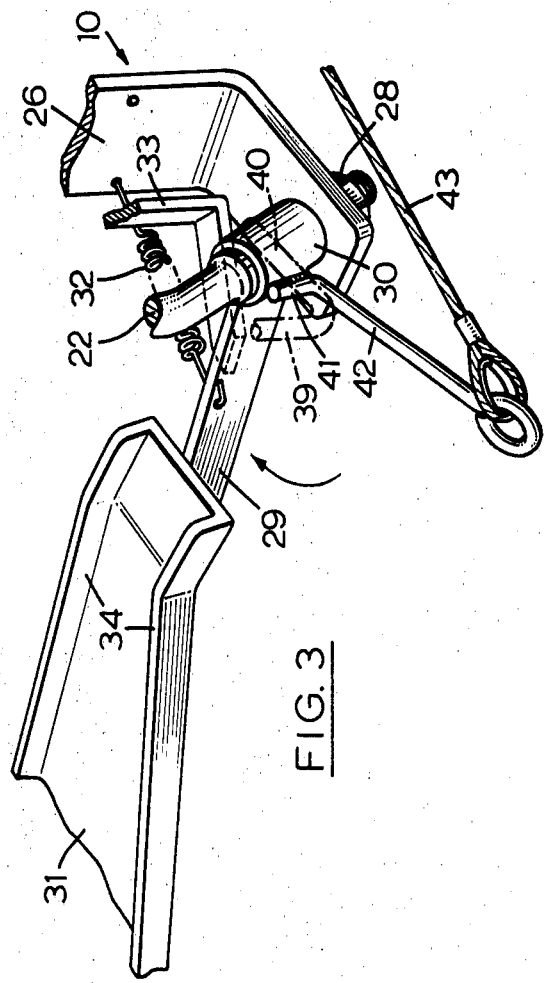

United States Patent Office 3,565,459
Patented Feb. 23, 1971

3,565,459
AUTOMATIC HITCH
Kenneth W. Reid, R.R. 2, Norval, Ontario, Canada
Filed Apr. 17, 1969, Ser. No. 817,029
Int. Cl. B60d 1/04
U.S. Cl. 280—477                                   8 Claims

ABSTRACT OF THE DISCLOSURE

An automatic hitch for connecting a tractor and trailer comprises a pole guide unit and a jaw unit which are latched together by mutual engagement thereof; a pole guide member for guiding the pole unit into the jaw unit is movable between operative and inoperative positions and is latched in its operative position; entry of the pole unit into the jaw unit unlatches the pole guide member and permits it to move to its inoperative position.

FIELD OF THE INVENTION

The present invention is concerned with improvements in or relating to automatic hitches, such as are used to connect together an agricultural tractor and a trailer, the hitch comprising parts that connect together automatically when the said parts are mutually engaged with one another.

DESCRIPTION OF THE PRIOR ART

Automatic hitches have been proposed hitherto comprising mutually engageable parts adapted for mounting on the tractor and trailer, these parts connecting automatically to one another upon such engagement, usually caused by backing the tractor up to the trailer. It is in practice essential that the hitch parts be engageable with one another without handling by the tractor operator, and in fact without the operator leaving the tractor seat, and to this end one of the hitch parts (usually that on the tractor) is provided with guide means that will guide the two parts into their cooperative engagement, even if the tractor approaches the trailer in a direction much inclined to the trailer longitudinal centre line. Such guide means must be located relatively close to the ground and in their operative position are especially vulnerable to snagging and damage.

DEFINITION OF THE INVENTION

It is an object of the present invention to provide a new automatic hitch.

It is a more specific object to provide a new automatic hitch comprising guide means that will move automatically from a lower, rearward operative position to a higher, side inoperable position upon completion of the hitching operation.

In accordance with the present invention there is provided an automatic hitch for connecting together a tractor and a trailer, comprising a jaw unit adapted to be mounted on one of the tractor and trailer and a cooperating pole unit adapted to be mounted on the other of the tractor and trailer, the jaw and pole units being mutually engageable to connect the tractor and trailer together, the jaw unit comprising a latch member for latching the pole unit thereto, a pole guide member mounted for rotation about an axis and moveable about the said axis between an operative position in which it is located to guide the pole unit into engagement with the jaw unit and an inoperative position to one side of the jaw unit, means for moving the pole guide member from the operative to the inoperative position, a latch operative to hold the pole guide member in the said operative position and releasable by the engagement of the jaw and pole units to permit movement of the pole guide member to its inoperative position.

DESCRIPTION OF THE DRAWING

An automatic hitch that is a particular preferred embodiment of the invention will now be described, by way of example, with reference to the accompanying diagrammatic drawings, wherein:

FIG. 2 is a side elevation of a detail, and FIG. 3 is a perspective view of a detail from FIG. 1 showing the guide means in stored position.

DESCRIPTION OF THE PREFERRED EMBODIMENTS

Figure 1:
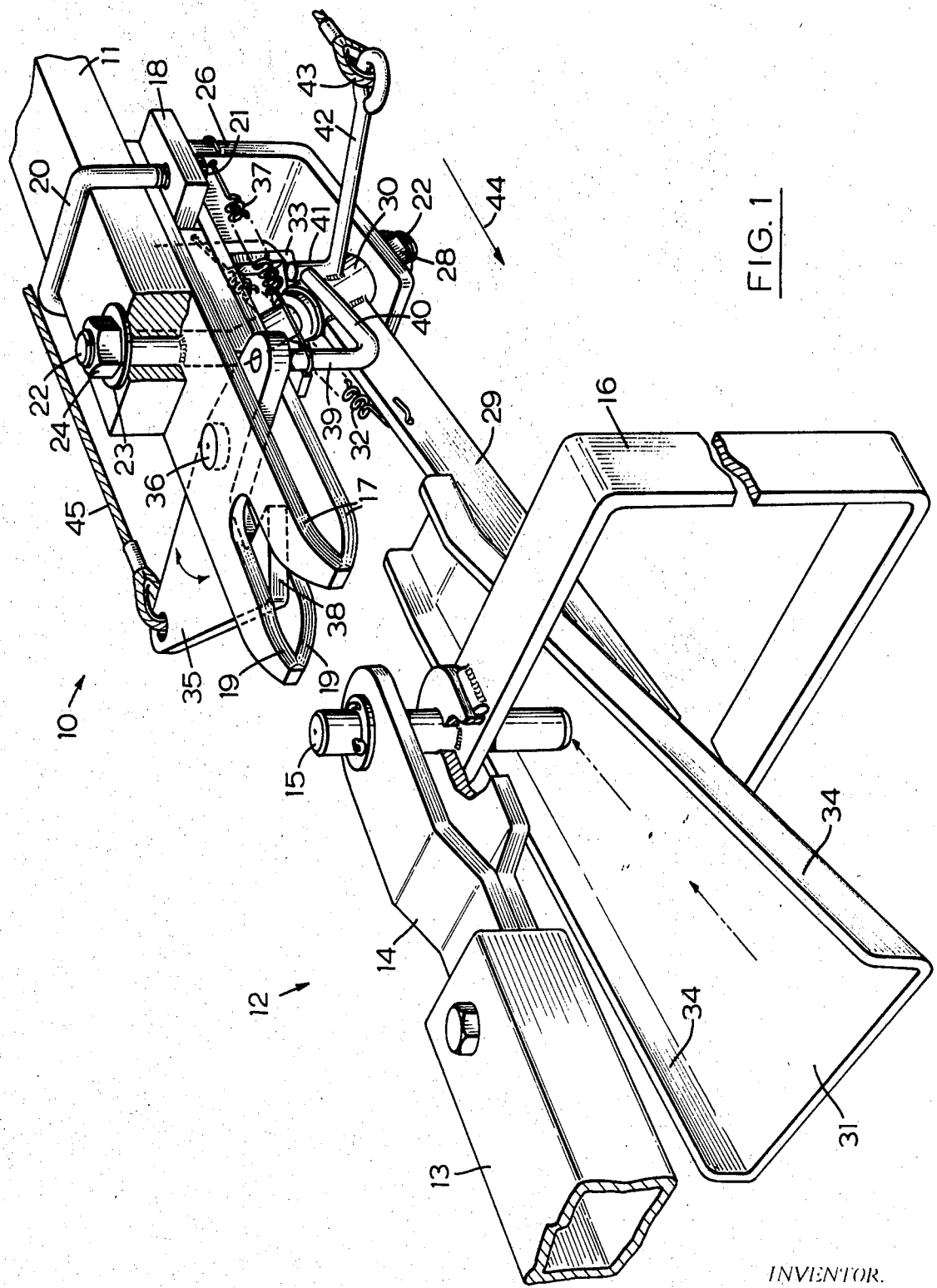
FIG. 1 is a general perspective view taken from one side of the trailer unit and looking toward the rear of the tractor unit.

The hitch comprises two mutually engageable parts, namely a tractor unit 10 that is fastened to a draw bar 11 of the tractor, and a trailer draw pole unit 12 which is fastened to a draw pole 13 of the trailer. In this embodiment the tractor unit is a jaw unit while the trailer unit is a pole unit, and for convenience in description "front" and "rear" will be used, assuming the most common arrangement that the tractor will be in front of the trailer and will pull it. In other embodiments the tractor unit may be the pole unit while the trailer unit is the jaw unit.

The trailer draw pole unit 12 comprises two forwardly-extending, bar members 14 fastened to the draw pole 13, these members being spread apart at their extreme front end and having a hitch pole 15 extending vertically between them. A generally C-shaped ground-engaging frame 16 is fastened to the bottom member 14 and ensures that the unit cannot drop below a predetermined height from the ground when the hitch is uncoupled.

The jaw unit comprises two spaced, generally-paralel bar members 17 having a spacer member 18 interposed between their adjacent front ends. The adjacent rear ends of the two members 17 are provided with respective vertically-registering slots 19 that are of progressively decreasing widths toward their front ends to constitute a forwardly-converging jaw. The rear ends of the plates are bent towards one another until they touch, and the touching ends are joined together (for example by welding), so as to provide a strong unitary jaw. The members 17 are, in this particular embodiment, fastened to the draw bar 11 by means of a U-shaped staple 20 which embraces the draw bar and has its ends extending through the spacer member 18, these ends being screw threaded and provided with respective lock washers and nuts 21.

The members 17 are also fastened to the tractor draw bar by a solid pin 22, the upper portion of which extends vertically through respective apertures in the members 17 and the draw bar, the pin upper end being provided with a washer 23 and a fastening nut 24. The portion of the pin comprises a bearing portion which supports a pole guide to be described in detail below, the extreme lower end thereof passing through an aperture in a bracket 26 that is fastened to the adjacent end of the lower bar member 17, the pin lower end being provided with a washer and fastening nut 28. It will be seen from FIGS. 1 and 3 that the pin 22 is cranked, so that the longitudinal axis of the lower portion thereof providing the pole guide bearing is inclined downwardly and forwardly, preferably at an angle.

In this embodiment the pole guide unit comprises an arm member 29, provided at its front end with a boss 30, which is mounted for rotation about the said bearing portion of the pin 22, and which carries at its rear end a chute or pole guide member 31. This pole guide member is movable between an operative position immediately to the rear of the tractor unit (shown in FIGS. 1 and 2), and an inoperative position to one side of the trailer unit (shown in FIG. 3), upon rotation of the arm about its bearing on the pin 22, the member being urged for forward movement from the operative to the inoperative position by a tension spring 32 which has one end connected to the arm 29, and the other end connected to the bracket 26. The extent of the forward movement of the arm 29 to the said inoperative position is determined by a stop member 33, which is fastened between the two members 17 and extends outward therefrom for engagement with the arm. The pole guide member tapers in width from the rear to the front, and its two side edges are each provided with an upstanding wall portion 34, so that the guide member has the form of a chute that can receive the hitch pole 15 of the draw pole unit and guide it toward the jaw.

A latch plate 35 is pivotally mounted between the two members 17 by means of a pin 36, and is urged to a latching position shown in FIG. 1 by a tension spring 37 connected between one arm of the latch plate and the bracket 26. The arm which constitutes the latch is so shaped that in the said latching position it presents an inclined front edge 38 to the hitch pole 15 as it enters the slots 19. The pole 15 can therefore push the latch plate to one side against the urging of the spring 37 as it enters the jaw, and will snap back to its latching position, in which it embraces the pole 15 and retains it in the extreme forward end of the jaw slot, as soon as the pole 15 clears the edge 38.

The said one arm of the latch plate is provided with a member having a downwardly-extending portion 39 to which the spring 37 is connected, and a forwardly-directed portion 40 which forms a sear engageable with a detent 41 on the rotatable boss 30 of the pole guide member. In this embodiment the detent is constituted by an angled bar which has the portion thereof forming the detent fastened as by welding to the boss 30, while the remainder 42 thereof extends radially outwards from the axis of rotation of the guide member unit.

In the normal operation of the tractor the pole guide member 31 will be in the said inoperative stored position shown in FIG. 3 in which it is to one side of the tractor and raised upwards from the ground a sufficient distance to ensure that in normal use there is no possibility of fouling or snagging. If it is now desired to couple the tractor to a trailer unit the operator pulls upon a rope, chain or other connecting member 43 connected to the outer end of the arm 42, whereupon the pole guide member is swung rearward and downward to the position shown in FIGS. 1 and 2, when the sear 40 engages the detent 41 and locks the member in the said operative position.

The tractor operator now backs the tractor towards the trailer, as indicated by the arrows 44. All that is required to ensure successful hitching of the two units together, is for the drive to direct the pole guide member so that it enters the C-shaped frame 16 of the draw pole unit. The width of the bottom rear end of the pole guide member is such that the protruding bottom end of the pole 15 must enter the guide member 31, and once therein cannot escape but is forced by the rearward movement of the tractor to ride up the guide member and enter the hitch jaw. Further rearward movement of the tractor pushes the portion of the hitch pole 15 between the two members 14 against the sloping cam edge 38 of the latch plate 35, forcing the latch plate to move against the action of the spring 37 until the pole is fully home in the jaw.

The above-described movement of the latch plate 35 under the action of the pin 15 causes a corresponding movement of the sear 40 out of engagement with the detent 41, so that as soon as the pole 15 is safely within the hitch jaw the guide member is released automatically and is immediately swung by the spring 32 sideways and upwards to the said stored position, without requiring any further action on the part of the operator.

The tractor is released from the trailer by the operator pulling on the rope, chain or other connecting means 45 connected to the latch plate 35 while the tractor is driven forward, this pull rotating the latch plate to its unlatched position so that the pole 15 can be withdrawn from the hitch jaw. If the guide member has been moved to its operative position but subsequently it is decided not to carry out a hitching operation, the member can be returned to the stored position by a pull upon the connecting means 45.

What I claim is:

1. An automatic hitch for connecting together a tractor and a trailer, comprising a jaw unit adapted to be mounted on one of the tractor and trailer and a cooperating pole unit adapted to be mounted on the other of the tractor and trailer, the jaw and pole units being mutually engageable to connect the tractor and trailer together, the jaw unit comprising a latch member for latching the pole unit thereto, a pole guide member mounted for rotation about an axis and moveable about the said axis between an operative position in which it is located to guide the pole unit into engagement with the jaw unit and an inoperative position to one side of the jaw unit, means for moving the pole guide member from the operative to the inoperative position, a latch operative to hold the pole guide member in the said operative position and releasable by the engagement of the jaw and pole units to permit movement of the pole guide member to its inoperative position.

2. An automatic hitch as claimed in claim 1, and comprising bearing means mounting the pole guide member for rotation about an inclined axis, whereby the said inoperative position is higher from the ground than the operative position.

3. An automatic hitch as claimed in claim 2, wherein said pole guide member comprises an arm mounted at one end by said bearing means for rotation about the said inclined axis, a trough member of decreasing width toward the jaw unit mounted at the other end of the arm spring means connected between the arm and the jaw unit for moving the guide member to the inoperative position, and connecting means connected to the arm for an operator to move the guide member to the operative position.

4. An automatic hitch as claimed in claim 3, wherein said jaw unit comprises means providing a jaw slot, a latch plate mounted in said jaw slot for pivoting movement about an axis and movable about said axis by the hitch pole toward its unlatching position upon entry of the hitch pole into the jaw slot, spring means connected between said latch plate and the jaw unit and urging the latch plate to its latching position, connecting means operable by an operator to move the latch plate to its unlatching position, a sear member extending from said latch plate and movable therewith and a detent member mounted on said arm and engageable by said sear member when the pole guide member is in operative position to retain it in said position.

5. An automatic hitch as claimed in claim 1, wherein the said pole unit comprises two vertically-spaced upper and lower pole supporting members, a hitch pole supported by the said members and protruding below the lower member for engagement with the pole guide member of the jaw unit, and a C-shaped frame member adapted to engage the ground and support the pole unit at a minimum height therefrom.

6. An automatic hitch as claimed in claim 1, wherein the said latch for holding the pole guide member comprises a detent member thereon and a sear member movable with the pole unit latch member, whereby latching movement of the pole unit latch member releases the pole guide unit latch to permit the pole guide member to return to its inoperative position.

7. An automatic hitch as claimed in claim 1, wherein said pole unit latch comprises a latch member mounted in the jaw, spring means urging the latch member for movement to its latching position, a cam face provided by the latch member in the path of the hitch pole, so that movement of the hitch pole into the jaw unit to the latching position moves the latch member against the action of said spring means and a latch sear for the pole guide member latch carried by the said latch member and movable therewith to release the pole guide unit latch and permit the pole guide unit to move to its said inoperative position.

8. An automatic hitch as claimed in claim 1, wherein said jaw unit comprises means providing a jaw slot, a latch plate mounted in said jaw slot for pivoting movement about an axis and movable about said axis by the hitch pole toward its unlatching position upon entry of the hitch pole into the jaw slot, spring means connected between said latch plate and the jaw unit and urging the latch plate to its latching position, connecting means operable by an operator to move the latch plate to its unlatching position, and means operably connecting the latch plate and the pole guide member latch to release the latter upon unlatching movement of the latch plate by the hitch pole or an operator.

References Cited

UNITED STATES PATENTS

| | | | |
|---|---|---|---|
| 1,384,944 | 7/1921 | Flood | 280—510X |
| 2,478,591 | 8/1949 | Miller | 280—510X |
| 2,783,059 | 2/1957 | Hartl | 280—509 |
| 2,826,432 | 3/1958 | Clever | 280—477 |
| 2,844,390 | 7/1958 | Smith | 280—477 |
| 2,976,061 | 3/1961 | Embree | 280—509 |
| 3,325,186 | 6/1967 | Lund | 280—477 |

LEO FRIAGLIA, Primary Examiner

U.S. Cl. X.R.

280—510